March 15, 1955     I. CROOK     2,704,206
MIXING AND DISPENSING DEVICE
Filed Jan. 21, 1954
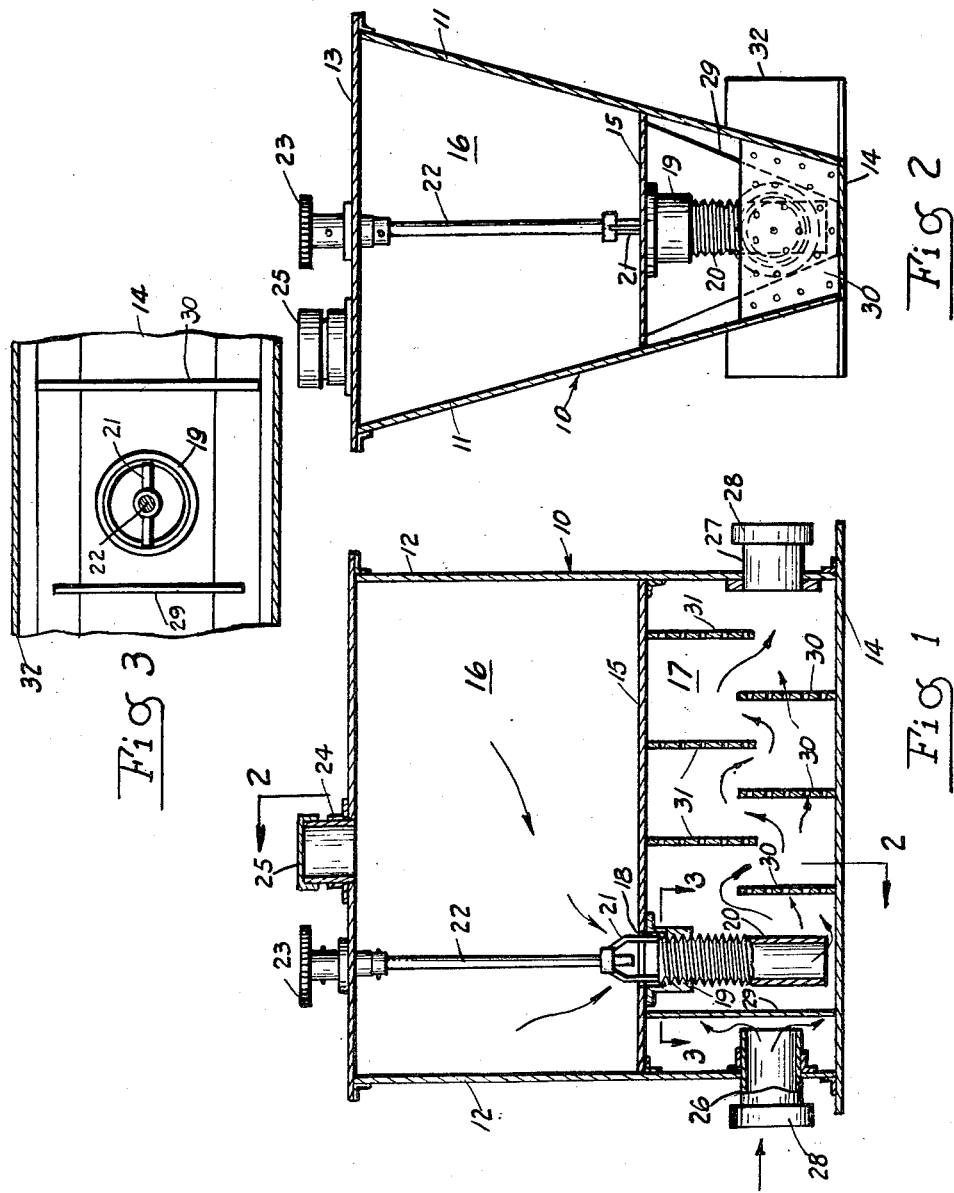
INVENTOR.
Isadore Crook
BY
*Salvatore G. Militana*
Attorney United States Patent Office 2,704,206
Patented Mar. 15, 1955

2,704,206

MIXING AND DISPENSING DEVICE

Isadore Crook, Miami, Fla.

Application January 21, 1954, Serial No. 405,413

1 Claim. (Cl. 259—4)

This invention relates generally to dispensers and is more particularly directed to dispensers of the type which are adapted to be used in the mixing and dispensing of materials such as powdered fertilizers, plant foods, paints and the like by the use of a flow of water.

A principal object of the present invention is to provide a device for mixing and dispensing powdered materials such as fertilizer, plant food, paint and the like which device is simple and inexpensive in construction and extremely easy to connect to a garden hose whereby a solution of water and powdered material is produced ready to be sprayed upon a lawn, plants or objects to be painted as the case may be.

A further object of the present invention is the provision of a dispenser characterized as above which permits a complete and thorough mixing of water and powdered material prior to the discharge of the solution therefrom.

A still further object of the present invention is to provide a dispenser described hereinabove with an adjustable control member for varying, as desired, the rate at which the powdered material is dissolved by the water flowing therethrough.

With these and other objects in view, the invention will be best understood from a consideration of the following detailed description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claim.

In the drawings:

Figure 1 is a vertical sectional view taken along substantially the longitudinal axis of the device embodying my invention.

Figure 2 is a sectional view taken along the line 2—2 of Figure 1.

Figure 3 is a fragmentary enlarged sectional view taken along the line 3—3 of Figure 1.

Referring now to the drawing wherein similar numerals are used to designate like parts throughout the several views, the numeral 10 refers to the device generally which consists of a pair of side walls 11 diverging inwardly and downwardly with end walls 12, 12 secured to the end portions thereof and a top wall 13 and a bottom wall 14 secured to the top and bottom portions of the walls 11 and 12. Intermediate of the top and bottom walls 13 and 14 respectively there is a horizontally disposed partition 15 secured therein to form an upper or powder chamber 16 and a lower or mixing chamber 17. The partition 15 is provided with a bore 18 connecting the chambers 16 and 17. A collar 19 which is provided with internal threads is secured to the underside of the partition 15 at the bore 18 extending downwardly in the mixing chamber 17. A tubular member 20 provided with external threads is threadedly mounted in the collar 19 so that its lower portion is positioned adjacent the lower wall member 14. In order to permit the adjustment of the tubular member 20 as is explained in detail hereinafter, a yoke 21 which is secured to the upper portion of the member 20 extends upwardly into the powder chamber 16 where it is secured to a rod 22. The other end of the rod 22 extends beyond the top wall 13 where a knob 23 is fitted thereon for manipulating the rod 22. The top wall 13 is further provided with a tubular member 24 which communicates with the powder chamber 16 to permit the filling of the chamber 16 with powdered fertilizer, paint or the like. A closure cap 25 is removably secured to the member 24.

The mixing chamber 17 is provided with an inlet duct 26 mounted on one of the end walls 12 and an outlet duct 27 mounted on the other end wall 12. Each of the ducts 26 and 27 are provided with a hose coupling 28 so that a garden hose or the like may be readily connected thereto. Adjacent the inlet 26 there is a vertically disposed baffle plate 29 secured at the top to the partition 15 and at its bottom portion to the bottom wall 14 but having its side edges in spaced relation to the side walls 11, 11 to permit water to pass beyond the baffle plate 29 along the sides thereof. Between the tubular member 20 and the outlet 27 are a plurality of perforated baffle plates 30 mounted on the lower wall 14 and similar baffle plates 31 mounted on the underside of the partition 15, each of the baffle plates 30 and 31 being alternately mounted so as to provide a tortuous path for the fluids in the chamber 17 prior to their discharge through the outlet pipe 27. A support 32 mounted at the base of the device 10 provides the latter with stability thereby preventing the device from being overturned easily since the device 10 when filled with powdered material becomes slightly top heavy.

In the operation of the device 10, the chamber 16 is filled with powdered fertilizer, plant food and the like, and the handle 23 is rotated so as to adjust the position of the member 20. If a heavily concentrated solution is desired, the tubular member 20 is retracted upwardly so that a greater volume of water is permitted to flow between the bottom wall 14 and the lower end of the tube 20 to dissolve the powdered material. If it is desired to provide a weak solution mixture of water and powdered material, then the handle 23 is rotated so as to position the lower end of the tubular member 20 in close proximity to the bottom wall 14 thereby limiting the volume flow of water therebetween.

Now, a hose connected to a source of water under pressure is connected to the coupling 28 of the inlet 26 and a discharge hose is connected to the outlet 27. When water flows into the inlet 26, it impinges upon the baffle plate 29 and flows into the chamber 17 between the side edges of the baffle plate 29 and the side walls 11, 11. The water that flows between the lower end of the tube 20 and the bottom wall 14 will dissolve the powdered material and become thoroughly mixed with the remaining water as the water flows past the plurality of baffles 30 and 31 to the outlet 27 where it is carried by a hose to become discharged.

What I claim as new is:

A mixing and dispensing device comprising a container having end walls, side walls diverging downwardly and inwardly, a top and bottom wall for said container joining said side and end walls, a partition extending between said end and side walls forming a storage chamber and a mixing chamber, said partition having a bore, a threaded collar secured to said partition at said bore, a tubular member threadedly mounted on said collar and extending in said mixing chamber to adjacent said bottom wall, a yoke secured to the top portion of said tubular member, a shaft secured to said yoke and extending through said top wall, a handle secured to said shaft for adjusting said tubular member, said mixing chamber having a fluid inlet adjacent said tubular member and a fluid outlet at the opposite end of said mixing chamber, a baffle plate positioned in said mixing chamber between said inlet and said tubular member and secured to said partition and said bottom wall, said baffle plate having its side walls in spaced relation with said first named side walls, and a plurality of perforated baffle members secured alternately to said bottom wall and said partition thereby providing a tortuous path to the flow of fluid in said mixing chamber from said fluid inlet to said outlet.

References Cited in the file of this patent

UNITED STATES PATENTS

| | | |
|---|---|---|
| 149,820 | Wilkie | Apr. 14, 1874 |
| 1,745,291 | Bleil | Jan. 28, 1930 |
| 2,305,269 | Moreland | Dec. 15, 1942 |
| 2,488,884 | Van Dyck | Nov. 22, 1949 |
| 2,645,463 | Stearns | July 14, 1953 |